(12) United States Patent
Osborn et al.

(10) Patent No.: US 10,185,446 B2
(45) Date of Patent: Jan. 22, 2019

(54) TOUCH SENSOR ARRAYS WITH INTEGRATED INTER-LAYER CONTACTS

(75) Inventors: Jay Kevin Osborn, Dublin, CA (US); Peter W. Richards, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1578 days.

(21) Appl. No.: 12/906,025

(22) Filed: Oct. 15, 2010

(65) Prior Publication Data

US 2012/0092285 A1 Apr. 19, 2012

(51) Int. Cl.
*G06F 3/044* (2006.01)

(52) U.S. Cl.
CPC .................... *G06F 3/044* (2013.01)

(58) Field of Classification Search
CPC ........... G06F 3/044; G06F 2203/04111; G06F 2203/04112
USPC ................. 345/173; 178/18.01, 18.03, 18.06
See application file for complete search history.

(56) References Cited

U.S. PATENT DOCUMENTS

| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,844,506 | A * | 12/1998 | Binstead ........................ 341/34 |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,587,097 | B1 | 7/2003 | Aufderheide et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,339,579 | B2 * | 3/2008 | Richter et al. ................. 345/173 |
| 7,663,607 | B2 | 2/2010 | Hotelling et al. |
| 8,085,250 | B2 * | 12/2011 | Reynolds et al. ............. 345/173 |

(Continued)

FOREIGN PATENT DOCUMENTS

| JP | 2000-163031 A | 6/2000 |
| JP | 2002-342033 A | 11/2002 |
| WO | WO-2012/051146 A1 | 4/2012 |

OTHER PUBLICATIONS

International Search Report dated Dec. 28, 2011, for PCT Application No. PCT/US2011/055690, three pages.

(Continued)

*Primary Examiner* — Jason Mandeville
(74) *Attorney, Agent, or Firm* — Morrison & Foerster LLP (57) ABSTRACT

Touch pad structures are provided that gather touch sensor data. The data may be used to control a computer or other electronic device. The touch pad structures may be integrated into a computer or other computing equipment or may be provided as a stand-alone accessory. The touch pad structures may include a touch sensor array. The touch sensor array may include rows and columns of touch sensor electrodes, interconnect lines, and other conductive structures. The conductive structures on the touch sensor array may be formed from patterned layers of ink. Interconnect line segments in different layer of ink may be connected in rectangular contact regions. The touch sensor array may have a tail. A layer of insulator may be removed from the substrate across a tip portion of the tail to allow the line segments to be connected.

17 Claims, 9 Drawing Sheets

(56) References Cited

U.S. PATENT DOCUMENTS

| | | |
|---|---|---|
| 8,479,122 B2 | 7/2013 | Hotelling et al. |
| 2003/0052867 A1* | 3/2003 | Shigetaka et al. ............ 345/173 |
| 2005/0126831 A1* | 6/2005 | Richter et al. ............. 178/18.01 |
| 2006/0026521 A1 | 2/2006 | Hotelling et al. |
| 2006/0197753 A1 | 9/2006 | Hotelling |
| 2007/0279395 A1 | 12/2007 | Philipp et al. |
| 2008/0143683 A1 | 6/2008 | Hotelling |
| 2009/0159344 A1 | 6/2009 | Hotelling et al. |
| 2009/0256817 A1 | 10/2009 | Perlin et al. |
| 2009/0273577 A1 | 11/2009 | Chen et al. |
| 2010/0026664 A1 | 2/2010 | Geaghan |
| 2010/0066702 A1 | 3/2010 | Lee et al. |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

TOUCH SENSOR ARRAYS WITH INTEGRATED INTER-LAYER CONTACTS

BACKGROUND

This relates to touch sensors, and more particularly, to techniques for forming touch sensor arrays for touch sensors in electronic devices.

Electronic devices such as portable computers and touch pads include touch sensors arrays. Many touch sensor arrays are based on capacitive touch electrodes that are arranged in intersecting rows and columns. When the finger of a user or other external object is brought into the vicinity of the touch electrodes, resulting capacitance changes can be detected. This allows the row and column position of the finger or other object to be located within the array of capacitive touch electrodes.

Capacitive touch sensor electrodes may be interconnected with associated capacitive touch sensor processing circuits using interconnect lines that are formed on the same substrate as the capacitive touch sensor electrodes. For example, capacitive electrodes for a touch sensor and associated interconnect paths may be formed by screen printing silver ink patterns onto a touch sensor substrate.

Conventional screen printing techniques may, however, use interconnect patterns and layouts that result in undesirably bulky touch sensors.

It would therefore be desirable to be able to provide improved ways in which to form touch sensor arrays for touch sensors.

SUMMARY

Touch sensor arrays may be provided for touch pads in computers and other equipment. The touch sensor arrays may be formed from patterned conductive structures on substrates such as polymer substrates. A touch sensor array substrate may have a rectangular region that contains rows and columns of capacitive touch sensor electrodes, interconnects, and other conductive structures. One or more rectangular tab-shaped tails may protrude from an edge of the rectangular substrate region.

The conductive structures on the touch sensor array may be formed from patterned layers of ink. Interconnect line segments in different layer of ink may be connected in rectangular contact regions. A layer of insulator may be provided on the substrate. In some regions, the insulator layer may be formed directly on the surface of the substrate. Upper ink layer structures may be formed on the insulator layer in these regions. In other regions, the insulator layer may be interposed between lower ink layer structures and the upper ink layer structures. The insulator layer may be removed from a tip portion of the tail to allow the interconnect line segments from the upper ink layer structures to contact interconnect line segments from the lower ink layer structures. In the tip portion of the tail, none of the insulator layer is present, so the upper ink layer structures may contact the lower ink layer structures. Parts of the upper ink layer structures may also be formed directly on the substrate. Because the tip region of the tail is free of the insulator layer, none of the insulator layer is formed on the substrate in the portions of the tip region substrate that lie between adjacent interconnect lines.

Further features of the invention, its nature and various advantages will be more apparent from the accompanying drawings and the following detailed description of the preferred embodiments.

DETAILED DESCRIPTION

Electronic devices such as portable computers, touch pads, and other electronic equipment may be provided with touch sensors.

Figure 1:
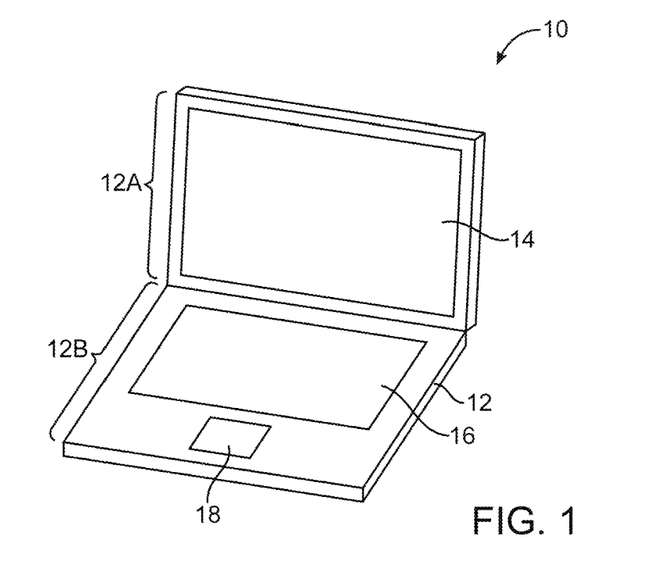
FIG. 1 is a perspective view of an illustrative portable computer with a touch sensor in accordance with an embodiment of the present invention.

An illustrative electronic device such as a portable computer or other electronic equipment that has a touch pad is shown in FIG. 1. As shown in FIG. 1, device 10 may have a housing such as housing 12. Housing 12 may be formed from a unibody construction in which some or all of housing 12 is formed form a unitary piece of material (e.g., metal, plastic, or fiber composite materials) or may be formed from multiple structures that have been mounted together using adhesive, fasteners, and other attachment mechanisms. For example, housing 12 may be formed from frame members and other internal supports to which external plates, housing sidewalls, bezel structures, and other structures are mounted.

Housing 12 may include display housing 12A and base housing 12B. Display 14 may be mounted in display housing 12A. Components such as keyboard 16 and touch pad 18 may be mounted in base housing 12B. Display housing 12A and base housing 12B may be connected using hinge structures.

During use of device 10, a user may move one or more fingers or other external objects over the surface of touch pad 18. Touch pad 18 may contain a touch sensor array that senses the locations of the user's finger(s). Using this type of arrangement, a user may provide touch input to control the operation of device 10.

If desired, accessories such as keyboards and stand-alone touch pads may be provided with touch sensor arrays.

Figure 2:
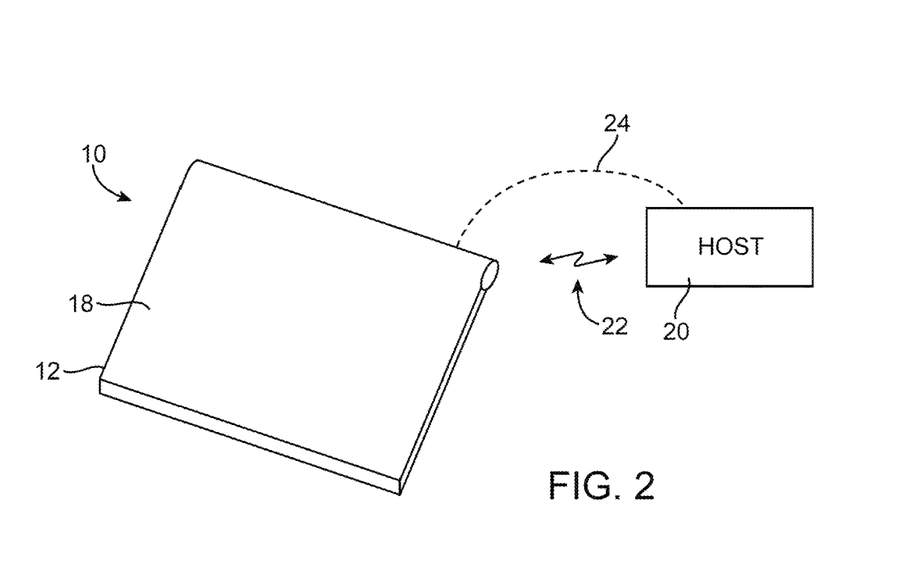
FIG. 2 is a perspective view of an illustrative touch pad having a touch sensor in accordance with an embodiment of the present invention.

Device 10 of FIG. 2 has a housing (housing 12) with an exposed planar surface that forms a touch pad (stand-alone touch pad 18). Device 10 of FIG. 2 may be wirelessly connected to external equipment such as host 20 using wireless link 22 or may be connected to host 20 using wired path 24.

Other equipment may include touch sensors if desired. The examples of FIGS. 1 and 2 are merely illustrative.

Touch pad sensors such as the sensors in touch pad 18 of FIG. 1 and touch pad 18 of FIG. 2 may be based on any suitable touch technology. For example, touch pads 18 may include resistive touch sensors, acoustic touch sensors, pressure-based touch sensors (e.g., touch sensors based on force sensors), or capacitive touch sensors (as examples). Capacitive touch sensors, which are sometimes described herein as an example, include arrays of capacitor electrodes for sensing changes in capacitance due to the presence of a user's fingers or other external objects at particular locations on the surface of the touch sensor. In a typical configuration, capacitor electrodes in a capacitive touch sensor are formed in an array pattern having rows and columns of sensor elements. Conductive lines may extend along the rows and columns of sensor elements to gather signals from the sensor elements. Interconnects may be used to route signals from the rows and columns to external circuitry.

Figure 3:
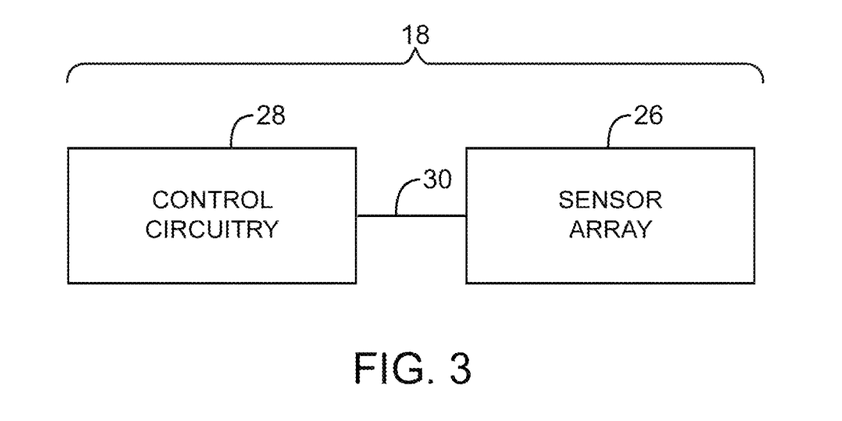
FIG. 3 is a circuit diagram of an illustrative touch sensor showing how the touch sensor may include a touch sensor array and an associated touch sensor control circuit in accordance with an embodiment of the present invention.

FIG. 3 is a circuit diagram showing how touch pad 18 may include a communications path such as path 30 for routing signals from touch sensor array 26 to control circuitry 28. Touch sensor array 26 may include an array of capacitive touch sensor electrodes or other touch sensor components. The capacitive touch sensor electrodes may be formed on a substrate. Path 30 may be formed from interconnect traces that are formed on the same substrate as the capacitive touch electrode and external cables such as flex circuit cables. Control circuitry 28 may include analog circuitry and digital circuitry. The analog circuitry may be used in measuring analog capacitance values from an array of capacitive electrodes. The digital circuitry may process the results of the analog capacitance measurements to extract position information from the sensor (i.e., to determine the positions of the user's fingers or other external objects on the surface of the touch sensor).

Figure 4:
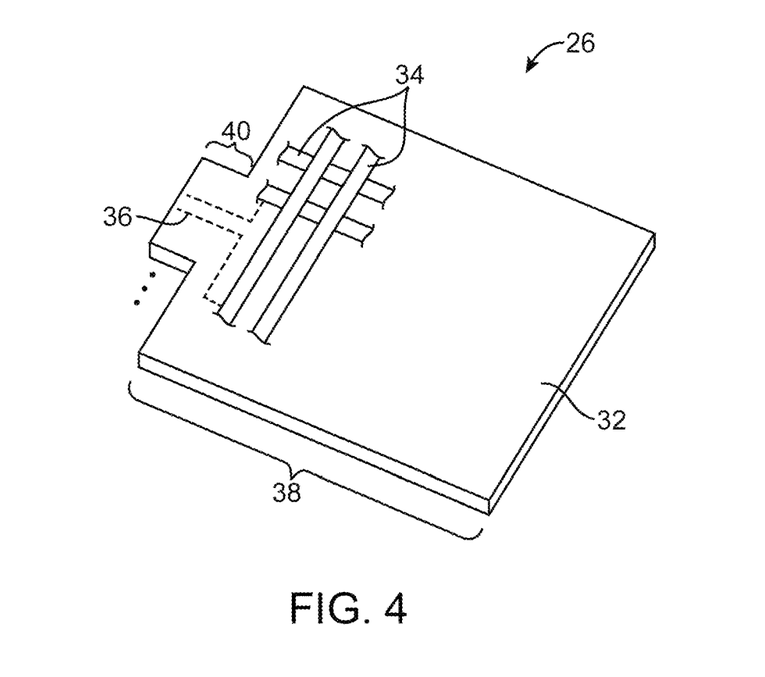
FIG. 4 is a perspective view of an illustrative touch sensor array in accordance with an embodiment of the present invention.

A perspective view of a touch sensor array that may be used in touch pad 18 is shown in FIG. 4. As shown in FIG. 4, touch sensor array 26 may include a substrate such as substrate 32. Substrate 32 may be formed from a rigid material or a flexible material. Examples of rigid substrate materials include rigid printed circuit board materials such as fiberglass-filled epoxy, glass, ceramic, etc. Examples of flexible substrate materials include flexible polyimide sheets, flexible sheets of polyethylene terephthalate (PET), or other flexible polymer layers.

Substrate 32 may, in general, have any suitable shape (e.g., a shape with protruding portions, a shape with straight edges, a shape with curved edges, a shape with curved and straight edges, etc.). As shown in FIG. 4, for example, substrate 32 may have a main rectangular portion such as rectangular portion 38. Substrate 32 may also have one or more tail portions such as tail portion 40. Tail portion 40 may, for example, be a rectangular tab that protrudes from one of the edges of rectangular substrate portion 38.

Conductive structures 34 are preferably arranged in rows and columns on substrate to form an array of capacitive electrodes. Multiple layers of conductive material may be used in forming conductive structures 34, so that row structures and column structures may intersect without shorting (e.g., so that overpass or underpass structures may be formed). Conductive structures 34 may include pads, serpentine structures, vertical and horizontal lines, and other structures for forming an array of capacitive electrodes and for routing signals from the array of capacitive electrodes to the edge portions of substrate 32. Interconnect lines in conductive structures 34 may run along the edges of substrate portion 38 and may extend onto tail 40 as shown schematically by dashed lines 36. When assembled into a completed touch pad sensor, tail 40 may be inserted into a connector. In the connector, the interconnect traces on tail 40 may mate with corresponding connector contacts. If desired, other types of connection arrangements may be used to connect interconnects in tail 40 to external components. For example, pads formed from conductive adhesive (e.g., anisotropic conductive film or anisotropic paste) may be used to connect interconnects in tail 40 to corresponding contact pads and traces on a mating printed circuit board.

Figure 5:
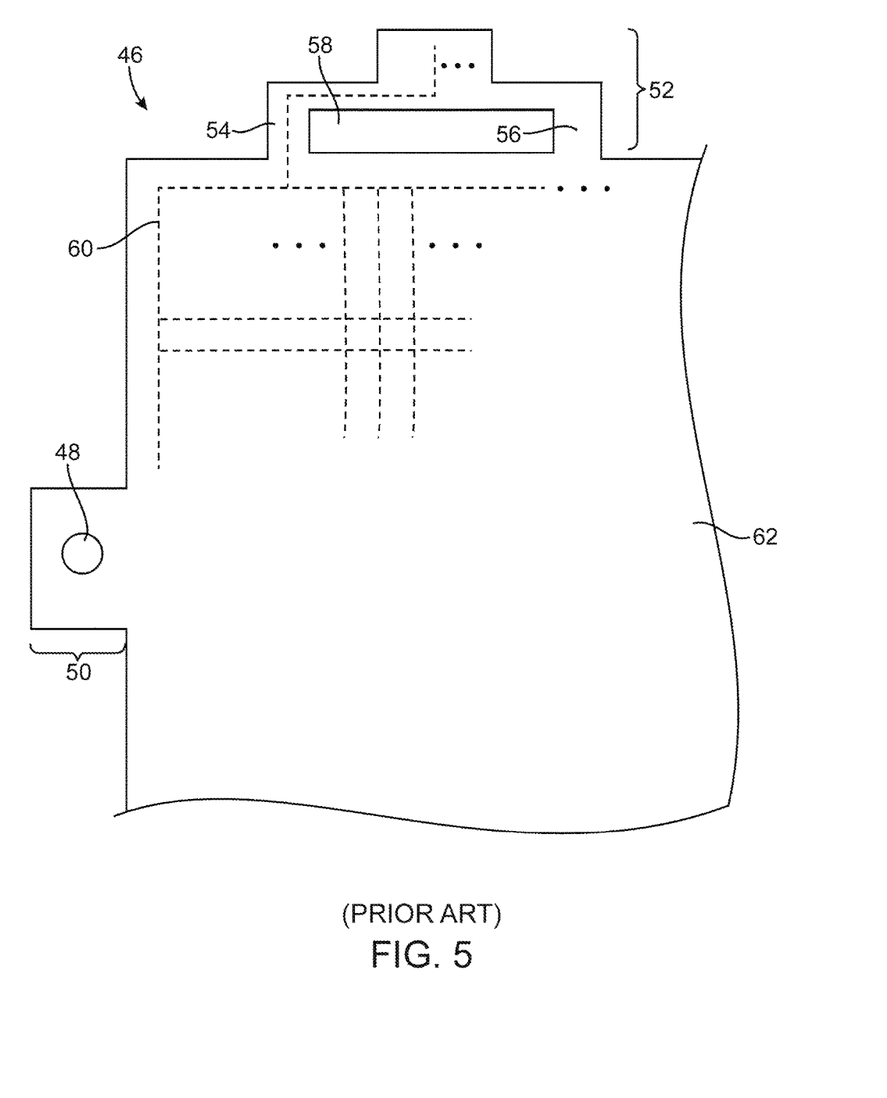
FIG. 5 is a top view of a conventional touch sensor array.

FIG. 5 is a top view of a conventional touch sensor array. As shown in FIG. 5, conventional touch sensor array 46 has substrate 62 onto which two layers of screen-printed silver ink structures 60 and insulating layers are formed. The pattern of silver ink structure 60 on substrate 62 forms an array of capacitive sensor electrodes and interconnect lines for connecting the capacitive sensors electrodes with external circuitry.

Substrate 62 has protrusions 50 and 52. When sensor array 46 is mounted in a device, protrusions 50 and 52 typically wrap under the main portion of substrate 62. As shown in FIG. 5, dome switch 48 is mounted on protrusion 50. Protrusion 52 forms a yoke-shaped tail portion of substrate 62 onto which the interconnect structures in structures 62 travel to interconnect sensor 46 with external components. Opening 58 separates portion 54 of tail 52 from portion 56 of tail 52. The yoke shape of tail 52 can help ensure that the interconnect lines that feed the tail are not overly crowded, but consumes a relatively large amount of space when tail 52 is wrapped under the main portion of substrate 62.

Figure 6:
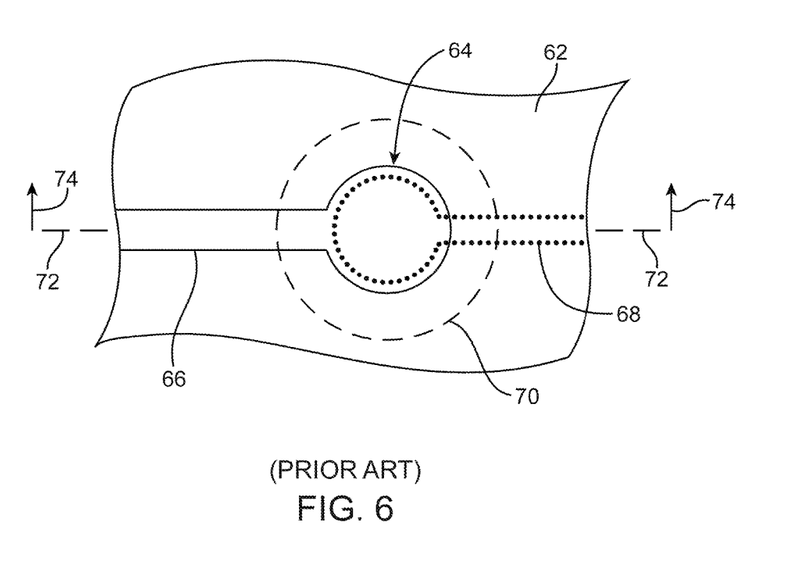
FIG. 6 is a top view of a portion of a conventional touch sensor array showing how traces formed from different silver ink layers may be provided with enlarged circular ends that are connected to each other through a circular opening in an intervening layer of insulator.

When forming a desired pattern of conductive structure 60 on substrate 62, it is sometimes necessary to interconnect the two layers of silver ink. A typical arrangement for forming a connection between upper and lower silver ink layers in conventional sensor array 46 is shown in FIG. 6. In the example of FIG. 6, a first conductive line (line 66) is being connected to a second conductive line (line 68) in circular contact region 64. Line 66 may be formed in a lower layer of silver ink and line 68 may be formed in an upper layer of silver ink. A layer of insulator may be interposed between the upper and lower silver ink layers. Circular opening 70 may be formed in the layer of insulator to allow line 66 to connect to line 68. In contact region 64, lines 66 and 68 have enlarged circular shapes.

Figure 7:
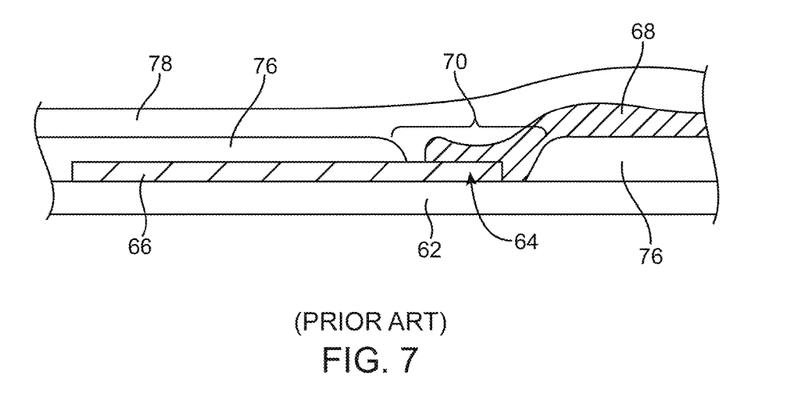
FIG. 7 is a cross-sectional side view of portion of the conventional touch sensor array that is shown in FIG. 6.

A cross-sectional side view of the conventional sensor array structures of FIG. 6 taken along line 72 and viewed in direction 74 is shown in FIG. 7. As shown in FIG. 7, line 66 may be formed from a lower layer of silver ink on substrate 62. Insulating layer 76 is formed on top of line 66 and abuts both the near and far sides of line 76. Opening 70 is formed in insulating layer 76. Line 68 may be formed from an upper layer of silver ink on top of insulating layer 76. Opening 70 allows line 68 to extend downwards to contact line 66 in circular contact region 64. Insulating layer 78 may cover line 68 and the other structures in FIG. 7.

Conventional sensor array ink conductors tend to occupy more space than desired, due to the size requirements of the enlarged circular portions of lines such as lines 66 and 68 of FIGS. 6 and 7 and the alignment requirement imposed by circular opening 70. This can cause conventional sensor arrays such as sensor array 46 of FIG. 5 to be excessively large.

Figure 8:
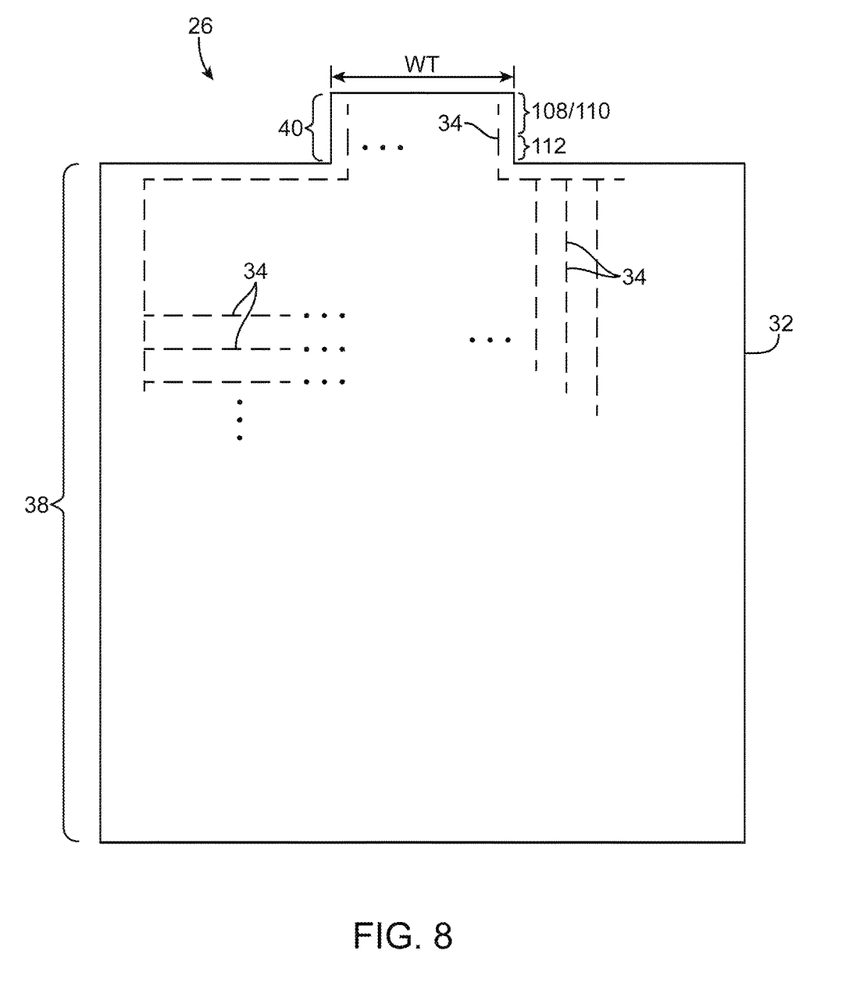
FIG. 8 is a top view of an illustrative touch sensor array showing how the array may include a rectangular tail in accordance with an embodiment of the present invention.

A sensor array of the type that may be used in devices such as device 10 of FIG. 1 or device 10 of FIG. 2 is shown in FIG. 8. As shown in FIG. 8, sensor array 26 may include conductive structures 34 on substrate 32. Substrate 32 may be a PET substrate or may be formed from other suitable materials (e.g., flexible sheets of other polymers, glass, ceramic, rigid printed circuit board material, etc.). Conductive structures 34 may be formed from one or more layers of patterned conductive material such as one or more layer of conductive ink (e.g., silver ink). The conductive ink or other conductive material may be deposited using ink-jet printing, pad printing, shadow mask deposition, etching, lift-off techniques, or other suitable techniques. With one illustrative arrangement, silver ink or other conductive ink is deposited in a desired pattern on substrate 32 using screen printing.

Patterned conductive material 34 may form capacitive sensor electrodes, conductive lines (e.g., peripheral interconnect lines or paths in a grid of electrodes), and other conductive structures. The patterned conductive material may, for example, form capacitive electrodes in rows and columns across sensor array portion 38 of substrate 32. Sensor array portion 38 may, for example, have a rectangular shape. Some of the patterned conductive material may extend into tail region 40. Tail region 40 may have a base region such as region 112 and a tip region such as tip region 108/110. Conductive interconnect lines 34 may extend through base region 112 into tip region 108/110.

Figure 9:
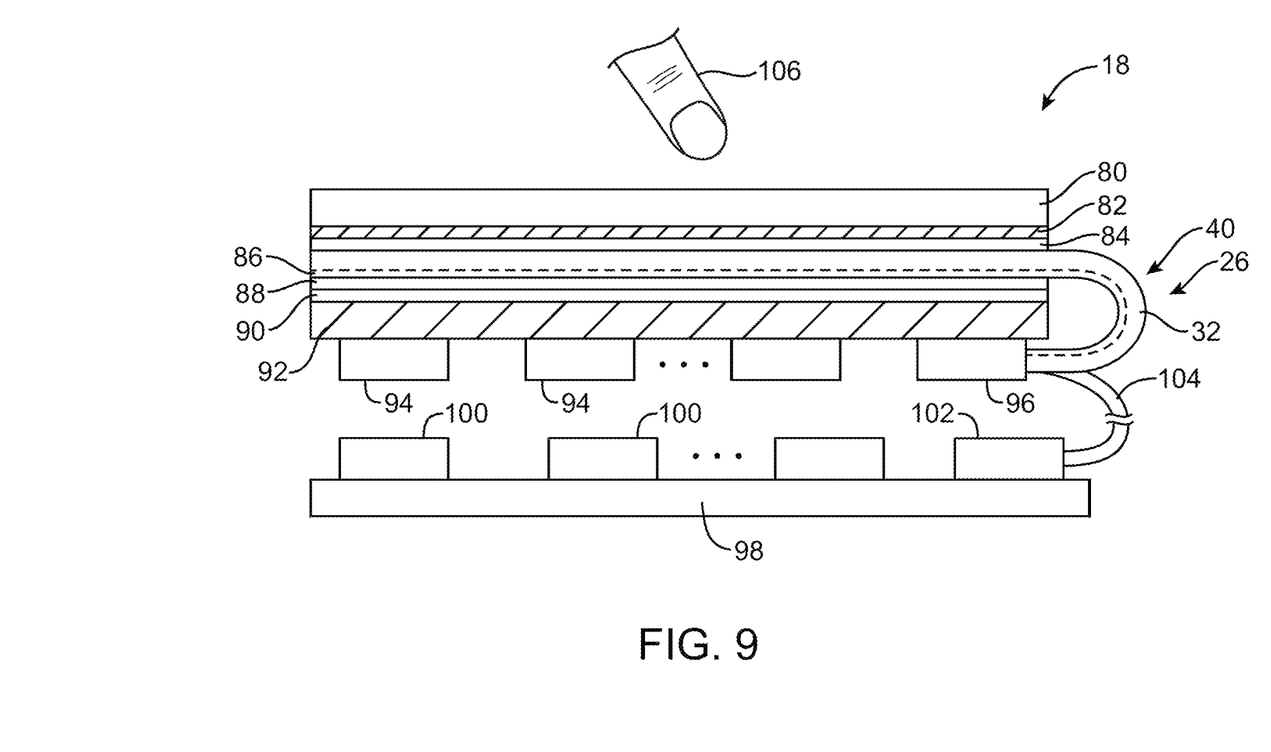
FIG. 9 is a cross-sectional side view of a touch sensor array and associated circuitry in accordance with an embodiment of the present invention.

FIG. 9 is a cross-sectional side view of touch pad 18. As shown in FIG. 9, touch pad 18 may include a touch sensor array such as touch sensor array 26 of FIG. 8. Touch sensor array 26 may be mounted under glass layer 80. During operation of touch pad 18, touch sensor array 26 may sense the location of a user's fingers or other external objects on the exposed surface of glass layer 80 (see, e.g., object 106 of FIG. 9).

To block internal components in sensor 18 from view by a user, the inner surface of glass layer 80 may be coated with an opaque masking layer such as ink layer 82. Ink layer 82 may be black, silver, gray, white, blue, green, red, or may have other suitable colors or patterns with multiple colors.

Adhesive layer 84 may be used to attach glass layer 80 (and opaque masking layer 82) to substrate 32 of sensor 26. Underside portion 86 of sensor 26 may include conductive structures 34 (FIG. 8). Adhesive layer 88 may be used to attach underlying structures in touch pad 18 to the lower surface of sensor 26. For example, layers such as layers 90 and 92 may be attached to sensor 26 using one or more layers of adhesive. Layer 90 may be, for example, a layer of metal such as a layer of aluminum foil (e.g., to form a shielding ground plane). Layer 92 may be, for example, a printed circuit board on which components 94 may be mounted. Components 94 may include integrated circuits for monitoring capacitance signals in sensor array 26. A connector such as connector 96 may receive the tip of substrate tail 40. Contacts in connector 96 may make electrical contact with mating conductive lines 34.

Flex circuit cable 104 or other communications path structure may be used to interconnect printed circuit board 92 and the circuitry that is connected to board 92 such as sensor 26 and components 94 to external boards. For example, cable 104 may be used to route signals to and from printed circuit board 98. Additional components 100 and additional connectors such as connector 102 may be mounted on printed circuit board 98. Cable 104 may extend between a connector on board 92 and connector 102 on board 98.

Sensor array 26 may use multiple layers of material 34. For example, multiple layers of silver ink (e.g., two or more layers) may be used to form sensor electrodes and interconnect lines on substrate 32. An insulating layer such as a layer of polymer (e.g., acrylic) or other dielectric may be interposed between adjacent layers of silver ink. When multiple layers of patterned ink are used in this way, patterns of conductors may be formed that pass over and under one another without shorting. When it is desired to transfer signals between one level of patterned ink to another, portions of the dielectric layer may be removed.

To help minimize size, sensor array 26 and the conductive paths on sensor array 26 may be formed using structures that use space efficiently. In particular, interconnect lines may include inter-layer contacts with minimal width. The width of the interconnect lines in contact (overlap) regions in which layer-to-layer connections are formed may, for example, be less than 0.3 mm, less than 0.25 mm, or less than 0.2 mm (as examples). Interconnect lines may have substantially straight edges in the contact regions and in the portions of the interconnect lines immediately adjacent to the contact regions. This type of arrangement may allow interconnects in tail 40 and other portions of sensor array 26 to be formed using compact layouts that help minimize the size of sensor array 26 and touch pad 18.

Figure 10:
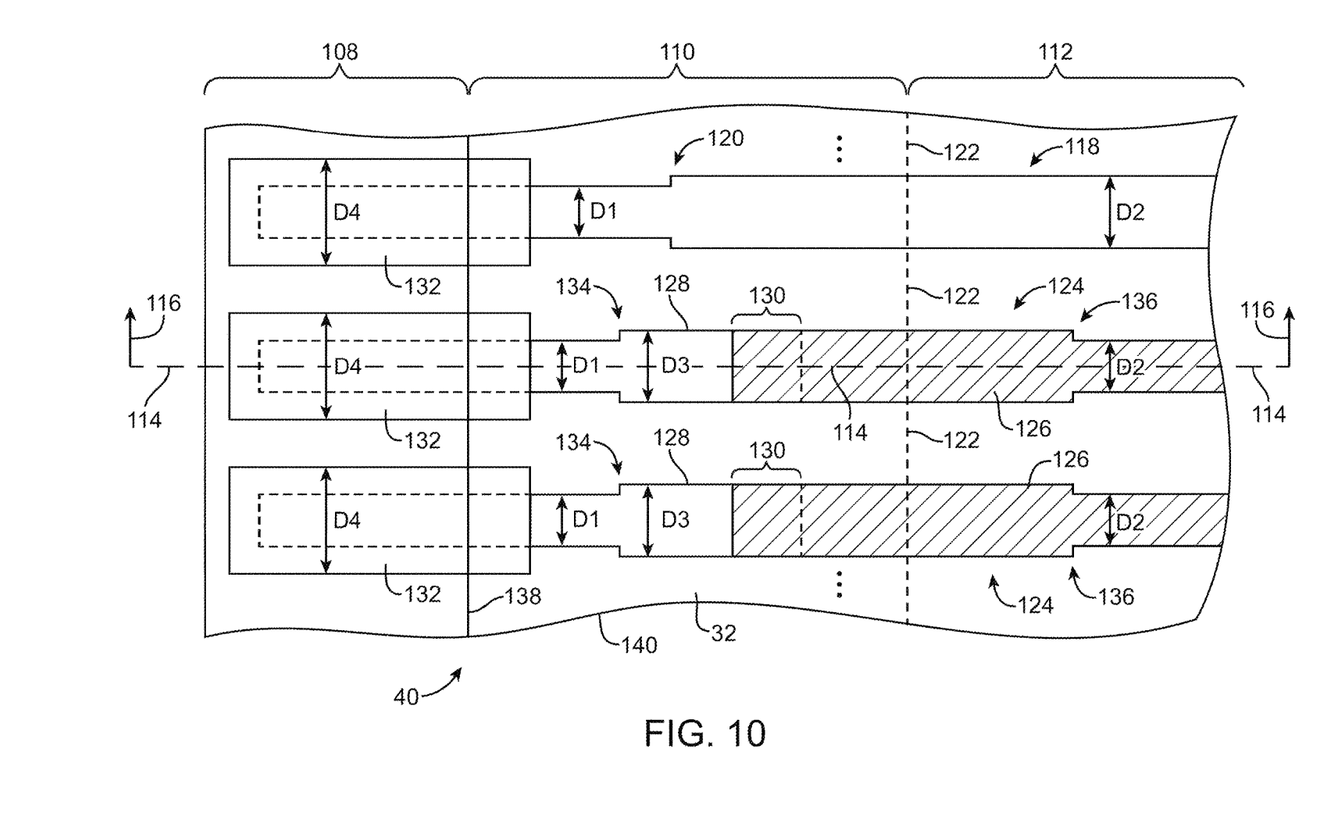
FIG. 10 is a top view of a portion of the touch sensor array of FIG. 9 in the vicinity of a tail structure in accordance with an embodiment of the present invention.

FIG. 10 is a top view of an illustrative portion of sensor array 26 in the vicinity of conductive material 34 (e.g., interconnect lines) that have been patterned to form at least one layer-to-layer connection. In the example of FIG. 10, the portion of the sensor array that is shown includes tail 40. Other portions of sensor array 26 may use layer-to-layer connection structures and layouts of the type shown in FIG. 10 if desired. The arrangement of FIG. 10 is merely illustrative.

As shown in FIG. 10, tail 40 may have a plurality of parallel interconnect lines such as lines 118 and 124. These lines may have longitudinal axes that run parallel to each other and run parallel to line 114, which serves as the longitudinal axis of the central interconnect line in the portion of tail 40 shown in FIG. 10. Lines 118 and 124 may terminate at contacts that are covered with pads 132 of carbon or other suitable coating material to improve durability when forming contacts with conductive structures in a connector such as connector 96 of FIG. 9. During operation of sensor 26, lines such as lines 118 and 124 may be used to route signals between sensor array 26 and external circuitry (see, e.g., circuits 94 and 100 of FIG. 9).

Some interconnect lines in tail 40 such as line 118 of FIG. 10 may be formed from a conductive structure in a single layer of silver ink (e.g., the lower of two layers of silver ink in an illustrative two-ink-layer configuration). Other lines in tail 40 such as lines 124 may be formed from multiple layers of ink. For example, lines 124 may include line segments 126 that are formed from an upper layer of ink (e.g., the top layer in the two layers of silver ink in a two-layer system) and segments 128 that are formed in a lower layer of ink (e.g., the bottommost layer in the two layers of silver ink in a two-layer system). Upper layer segments 126 and lower layer segments 128 may form electrical connections in contact regions 130.

To minimize area, contact regions 130 may be rectangular and the edges of the lines in contact regions 130 (and in the portions of the lines adjacent to contact regions 130) may be straight and parallel. Using integrated inter-layer contact structures such as these, line segments in different layers can be efficiently joined.

The widths of lines 118 and 124 may, if desired, be adjusted as a function of position along their lengths. For example, the width of single-layer line 118 may be reduced from width D2 (e.g., 0.2 mm) to width D1 (e.g., 0.15 mm) using width-changing step 120 or a more gradual width transition structure. Similarly, the width of lines 124 may be varied. Each line 124 may, for example, have a width of D2 (e.g., 0.2 mm) that increases to width D3 (e.g., 0.25 mm) at width-changing step 136 and that decreases to width D1 (e.g., 0.15 mm) at width-changing step 134. The use of relatively narrow width D2 may help prevent the line segments of width D2 from shorting to each other. The wider width D3 that is used in the vicinity of overlap regions 130 may help to form a satisfactory low-contact-resistance layer-to-layer electrical connection. The relative narrower width D1 that is used at the tip of tail 40 may help prevent adjacent lines from shorting to each other and may help ensure that carbon pads 132 will completely cover all exposed edges of the interconnect lines in outermost tip region 108 of tail 40.

In region 108, the conductive lines may be covered only by carbon pads 132 and no overlapping insulator layers. In inner tip region 110 and in region 112, coating insulating layer 140 (e.g., an acrylic layer or other dielectric layer) may cover the interconnect lines (and parts of carbon pads 132). Line 138, which represents the interface between regions 108 and 110 may correspond to the edge of insulating coating 140. Line 122 may correspond to the edge of the insulating layer that is sometimes used to separate and electrically isolate the upper and lower silver ink layers in sensor 26. Line 122 (i.e., the edge of the inter-layer isolation layer) may run perpendicular to the interconnect lines from edge to edge across substantially the entire width WT (FIG. 8) of tail 40 and may cover only base portion 112 of tail 140, while leaving the substrate in the tip of tail 140 (i.e., in tip region 108/110) uncovered by the inter-layer isolation layer and free of any inter-layer isolation layer material between adjacent interconnects.

Figure 11:
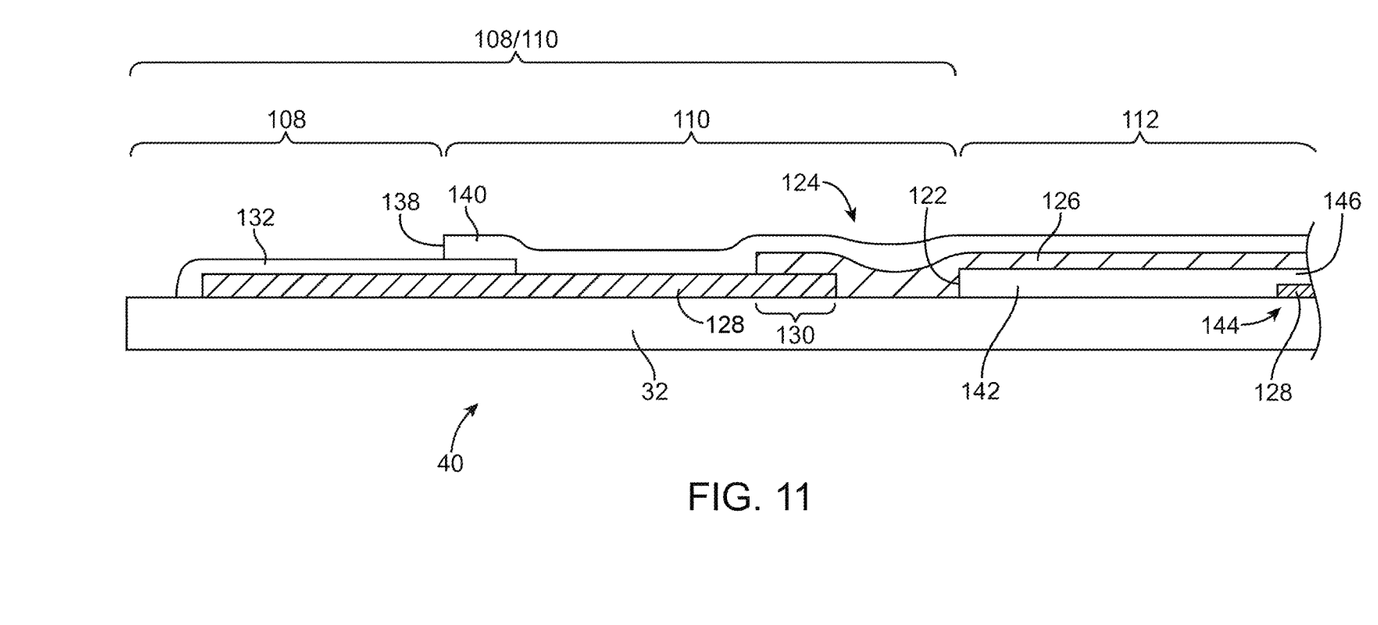
FIG. 11 is a cross-sectional side view of the sensor array of FIG. 10 in accordance with an embodiment of the present invention.

FIG. 11 is a cross-sectional side view of tail 40 of FIG. 10 taken along line 114 and viewed in direction 116. As shown in FIG. 11, line 124 may include a first segment such as segment 126 that is formed from line structures in the upper layer of silver ink and a second segment such as segment 128 that is formed from line structures in the lower layer of silver ink. Insulating layers such as inter-layer isolation layer 142 may be formed from one or more layers of acrylic or other dielectric materials.

In some portions of the sensor array such as illustrative portion 144 of FIG. 11, portions of insulating layer 142 such as portion 146 may be interposed between conductive structures 128 in the lower ink layer and conductive structures 126 in the upper ink layer. This prevents the upper and lower ink layer structures from forming undesired short circuit connections (e.g., to allow conductors in the upper and lower layers to pass over or under each other in the rows and columns of the sensor array when no electrical connection is desired).

In some regions, however, such as contact region 130, it is desired to form good Ohmic contact between layer 126 and 128. This may be accomplished by removing insulator 142 from portions 108 and 110 of tail 40, so that insulating layer 142 only is present in region 112 and so that tip region 108/110 of tail 40 is free of any of layer 142. Upper ink layer structure 126 may step down over edge 122 of insulating layer 142 at the boundary between regions 110 and 112. In contact region 130, line segment structures 126 overlap line segment structures 128 and electrically connect segments 126 and 128.

In region 108, the tips of segments 128 may be covered with pad 132 (e.g., a carbon pad or other conductive pad). Insulating coating layer 140 may be used to cover lines 118 and segments 128 and 126 of lines 124 in regions 110 and 112. Error free alignment and connections between upper layer line segments such as segments 126 and lower layer line segments such as segments 128 may be facilitated in tail 40 by the complete removal of insulator 142 from the tip of the tail region. In particular, connections are facilitated by removing insulator 142 from all portions of substrate 32 that lie to the left of edge 122 in FIG. 11 (i.e., by removing insulating layer 142 from rectangular regions 108 and 110). Edge 122 may run perpendicular to axis 114 of tail 40 (i.e., the dimension parallel to the longitudinal axis of each of interconnect lines 118 and 124 in tail 40, as shown in FIG. 10).

The foregoing is merely illustrative of the principles of this invention and various modifications can be made by those skilled in the art without departing from the scope and spirit of the invention.

What is claimed is:
1. A touch sensor array, comprising:
a substrate having a sensor array region and a tail that extends from the sensor array region; and
conductive touch sensor structures on the substrate, wherein at least some of the conductive touch sensor structures are formed in the sensor array region and at least some of the conductive touch sensor structures form parallel interconnect lines in the tail;
wherein at least one of the conductive touch sensor structures comprises first and second layers of conductive material in the tail having substantially the same widths at a contact region at which the first and second layers overlap and electrically contact each other, the widths at the contact region having substantially the same width as at least a portion of the second layer of conductive material outside the contact region, and wherein the tail has a tip region that is uncovered by a layer of insulator.
2. The touch sensor array defined in claim 1 wherein the first and second layers of conductive material have a common longitudinal axis.
3. The touch sensor array defined in claim 2 wherein the substrate comprises a flexible polymer.
4. The touch sensor array defined in claim 3 wherein the first and second layers of conductive material comprise conductive ink.
5. The touch sensor array defined in claim 3 wherein the conductive ink comprises screen printed silver ink.
6. The touch sensor array defined in claim 1 wherein the first layer of conductive material comprises a lower layer of conductive ink and wherein the second layer of conductive material comprises an upper layer of conductive ink.
7. The touch sensor array defined in claim 1 wherein at least another of the parallel interconnect lines is formed exclusively from a lower layer of conductive ink.
8. The touch sensor array defined in claim 1 wherein the contact region is rectangular.
9. The touch sensor array defined in claim 8 wherein the parallel interconnect lines each have a respective width and wherein at least one of the parallel interconnect lines has a width-changing step at which the width of that parallel interconnect line changes.

10. The touch sensor array defined in claim 1 wherein the parallel interconnect lines each have a respective width and wherein at least one of the parallel interconnect lines has a width-changing step at which the width of that parallel interconnect line changes.

11. The touch sensor array defined in claim 1 wherein the substrate comprises polyethylene terephthalate.

12. The touch sensor array defined in claim 1 wherein the tail has a rectangular shape.

13. A touch sensor array, comprising:
a substrate having a sensor array region and a tail;
conductive interconnect lines formed on the substrate from a patterned upper conductive ink layer and a patterned lower conductive ink layer; and
a layer of insulator, wherein some of the layer of insulator is interposed between the patterned upper conductive ink layer and the substrate and wherein some of the layer of insulator is interposed between the patterned upper conductive ink layer and the patterned lower conductive ink layer, and wherein at least one conductive interconnect line includes a contact region in the tail in which an upper line segment formed from the patterned upper conductive ink layer has substantially the same width as the patterned lower conductive ink layer and overlaps and electrically contacts a lower line segment formed from the patterned lower conductive ink layer, the width at the contact region having substantially the same width as at least a portion of the patterned upper conductive ink layer formed in the tail but outside the contact region.

14. The touch sensor array defined in claim 13 wherein the substrate has a rectangular portion with four edges and wherein the tail is rectangular and protrudes from one of the four edges.

15. The touch sensor array defined in claim 14 wherein the contact region is rectangular and wherein the layer of insulator has a straight edge that extends across at least some of the tail.

16. The touch sensor array defined in claim 15 wherein the conductive interconnect lines have widths and contain width-changing steps at which the widths change and wherein at least some of the width-changing steps are located on the tail.

17. An apparatus, comprising:
a substrate having a tail;
an upper patterned ink layer;
a lower patterned ink layer; and
an insulating layer, wherein at least some of the lower patterned ink layer touches the substrate, wherein at least some of the insulating layer is interposed between the upper patterned ink layer and the lower patterned ink layer, wherein at least some of the upper patterned ink layer touches the substrate, wherein the upper patterned ink layer comprises a plurality of first interconnect line segments, wherein the lower patterned ink layer comprises a plurality of second interconnect line segments, wherein each of the first interconnect line segments electrically contacts a respective one of the second interconnect line segments in a respective contact region in the tail at which the first and second interconnect line segments have substantially the same width as a portion of the first interconnect line segment formed in the tail but outside the contact region, and wherein the substrate is free of the insulating layer between at least a portion of the second interconnect line segments.

* * * * *